Dec. 30, 1930.  E. S. BULLOCK  1,786,599
BEETLE TRAP
Filed April 1, 1930
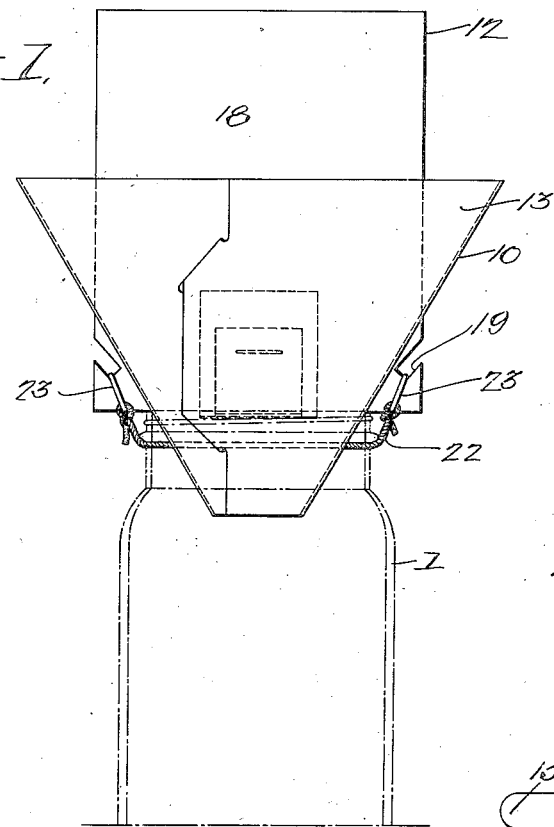
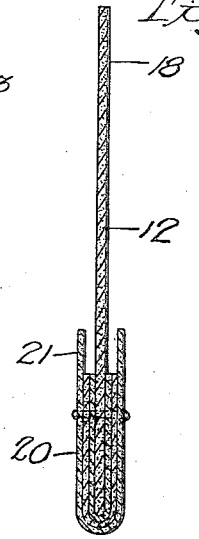
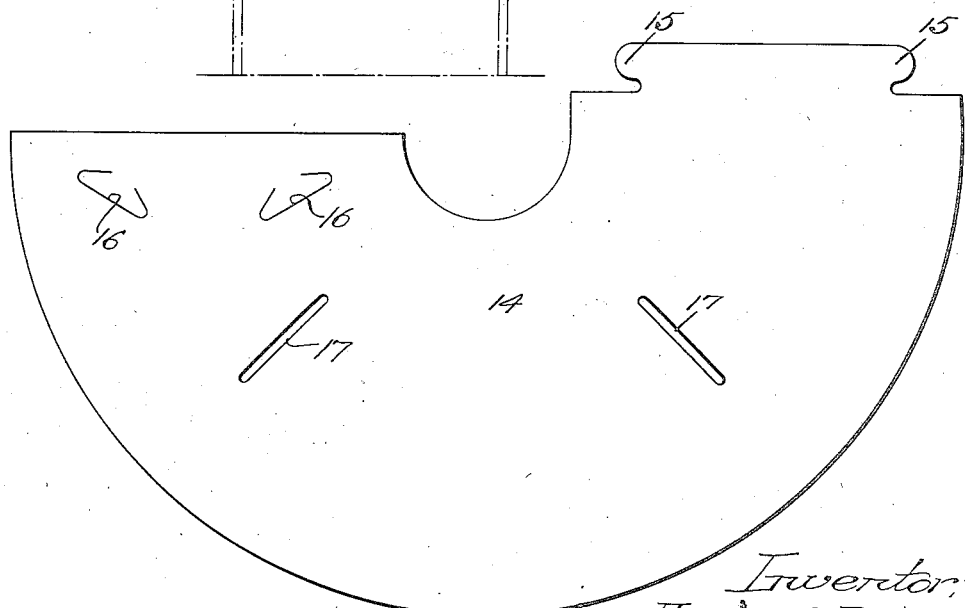
Inventor:
Edward S. Bullock
by his Attorneys,
Howson & Howson Patented Dec. 30, 1930

1,786,599

UNITED STATES PATENT OFFICE

EDWARD S. BULLOCK, OF LANSDOWNE, PENNSYLVANIA

BEETLE TRAP

Application filed April 1, 1930. Serial No. 440,781.

This invention relates to insect traps and more particularly to traps for use in conjunction with insects such as beetles which, upon finding their flight interrupted, seek to escape by folding their wings and dropping.

An important object of the invention is to produce a trap for this purpose of the type which may be generally referred to as a cone and baffle type, the construction of which is such that it can be manufactured at an extremely low cost and accordingly is available for distribution as an advertisement.

A further object of the invention is the provision of a trap of this character, the trapping elements of which consist entirely of paper.

A still further object of the invention is to provide a novel and improved assembly for the trapping elements, enabling these elements to be shipped flatly packed.

These and other objects I attain by the construction shown in the accompanying drawings wherein, for the purpose of illustration, I have shown a preferred embodiment of my invention and wherein:

Fig. 1 is a side elevation showing a beetle trap constructed in accordance with my invention, a receptacle being indicated in construction lines;

Fig. 2 is a vertical sectional view through the baffle element; and

Fig. 3 is a plan view of the blank from which the cone is formed.

Referring now more particularly to the drawings, the trap generally comprises a trapping section 10 and a container 1, which container may comprise a Mason jar, milk bottle, or any other wide-mouthed receptacle. The trapping section comprises a baffle 12 and a cone 13. In accordance with my invention the cone 13 is produced by employing a sheet 14 constituting the development of a cone, one edge of the sheet having ears 15 to engage in slits 16 formed for their reception in the other edge of the sheet, so that the edges of the sheet may be held together with the sheet in the form of a cone. In the body of the sheet radial openings 17 are provided, these openings being spaced through an angle such that in the completed cone they are disposed on a diameter of the cone. The baffle 12 comprises a sheet 18 of a width greater than the diameter of the cone at the bottom of the opening 17 and slightly less than the diameter of the cone at the upper ends of these openings. These fit in the side edges thereof and adjacent one end has formed therein notches 19 which incline inwardly and downwardly. About said edge of the sheet the pad 20 is secured, this pad being at present shown as comprising strips of blotting paper which have been impregnated with some material, the odor of which is attractive to the insect, the capture of which is sought. A sheet 21 impervious to the mixture with which the blotting paper 20 is impregnated, is preferably placed upon the face of the paper and the whole secured about the bottom edge of the sheet as by a staple.

In setting up the apparatus upon the container 1, a flexible element 22 is passed about the container adjacent the upper end thereof, a pair of rubber bands 23 being threaded on this flexible element before it is placed in position. The cone is then placed in position upon the mouth of the jar or receptacle and the sheet 18 placed in the cone with its lower corners projecting through the slots 17. The elastic bands are then placed over the hooks formed by the inclined notches 19 and serve to draw the baffle downwardly and therethrough to fit the cone in the mouth of the receptacle. Insects attracted by the odor of the pad and coming in contact with the baffle will fall through the cone into the receptacle, where they will remain until removed.

The material used in formation of sheets 14 and 18 is preferably waterproof paper of any suitable type and the faces of the baffle board may have imposed thereon any advertisement desired and instructions as to setting up the trap.

As the construction employed is capable of a considerable range of change and modification without in any manner departing from the spirit of my invention, I do not wish to be understood as limiting myself thereto except as hereinafter claimed.

I claim:

1. A trapping element for a trap of the type described, comprising a cone having diametrically-opposed longitudinally-extending slots, a baffle comprising a sheet having a width slightly greater than the diameter of the cone at the lower ends of the slots and less than the diameter of the cone at the upper end of the slots, having its corners extending through said slots and seating on the lower end walls thereof, and means coacting with said corners for securing said baffle in position in the cone.

2. A trapping element for a trap of the type described, comprising a cone having diametrically - opposed longitudinally - extending slots, a baffle comprising a sheet having a width slightly greater than the diameter of the cone at the lower ends of the slots and less than the diameter of the cone at the upper end of the slots, having its corners extending through said slots and seating on the lower end walls thereof, and means coacting with said corners for securing said baffle in position in the cone, said cone comprising a sheet, the side edges of which have means whereby they may be connected to one another.

3. A trapping element for a trap of the type described, comprising a cone having diametrically - opposed longitudinally - extending slots, a baffle having a width slightly greater than the diameter of the cone at the lower ends of the slots and less than the diameter of the cone at the upper end of the slots, having its corners extending through said slots, said corners having inwardly and downwardly inclining notches, a receptacle receiving the lower end of the cone and a member surrounding said receptacle and having connectors engaging in said slots.

4. A trapping element for a trap of the type described, comprising a cone having diametrically-opposed longitudinally-extending slots, a baffle having a width slightly greater than the diameter of the cone at the small end of the slots and less than the diameter of the cone at the uper end of the slots, having its corners extending through said slots, a receptacle receiving the lower end of the cone and resilient means connected to the receptacle and engaging the exposed corners of the baffle for drawing the baffle downwardly in the cone and the cone downwardly into the receptacle.

5. A trapping element for a trap of the type described, comprising a cone having diametrically-opposed longitudinally-extending slots, a baffle having a width slightly greater than the diameter of the cone at the small end of the slots and less than the diameter of the cone at the upper end of the slots, having its corners extending through said slots, said corners having downwardly and inwardly inclining notches, a receptacle receiving the lower end of the cone and looped resilient elements connected to the receptacle at diametrically-opposed points and engaged in said slots.

EDWARD S. BULLOCK.